United States Patent [19]

Mah et al.

[11] Patent Number: 5,597,091

[45] Date of Patent: Jan. 28, 1997

[54] SAFETY INDICATOR FOR AN INFLATION SYSTEM

[75] Inventors: Donald Mah, Richmond; Adrian Post, Vancouver, both of Canada

[73] Assignee: M.E.T.A. Reasearch Inc., Richmond, Canada

[21] Appl. No.: 394,993

[22] Filed: Feb. 27, 1995

[51] Int. Cl.$^6$ .................................................. G01L 19/12
[52] U.S. Cl. ........................... 222/3; 116/272; 222/23
[58] Field of Search ........................... 222/3, 5, 23, 41, 222/47; 141/95, 96; 116/264, 266, 268, 272

[56] References Cited

U.S. PATENT DOCUMENTS

| | | | |
|---|---|---|---|
| 1,488,754 | 4/1924 | Kempel | 116/272 |
| 2,263,840 | 11/1941 | Franck | 116/272 |
| 3,203,246 | 8/1965 | Horwitt et al. | 116/272 X |
| 3,675,722 | 7/1972 | Balmes, Sr. | 222/23 X |
| 3,738,311 | 6/1973 | Appleton | 116/272 |
| 3,952,691 | 4/1976 | Peltz et al. | 116/272 |
| 4,185,584 | 1/1980 | Brodine et al. | 116/272 |
| 4,894,036 | 1/1990 | Switlik | 441/93 |
| 4,927,057 | 5/1990 | Janko et al. | 222/23 X |
| 4,946,067 | 8/1990 | Kelsall | 222/5 |
| 5,180,081 | 1/1993 | McCann | 222/23 |
| 5,271,525 | 12/1993 | Petrie | 222/5 |
| 5,413,247 | 5/1995 | Glasa | 222/23 X |

*Primary Examiner*—Kevin P. Shaver
*Attorney, Agent, or Firm*—C. A. Rowley

[57] ABSTRACT

A discharge monitoring system for a compressed gas cylinder incorporates a seal rupturing pin mounted in a gas passage that is intended to connect to a conventional triggering mechanism for activating the seal rupturing pin connects to the object to be inflated. A chamber divided by a piston into a high pressure side which is directly connected to the gas passage and a lower pressure side on the opposite side of the piston. A flag or indicator associated with the piston is move into a flagging position when a high gas pressure is present in the gas passage and moves the piston to a displaced position. With this system, an initial high pressure formed in the gas passage immediately after the gas cylinder seal is punctured, develops a gas pressure within the chamber sufficient to displace the piston. The piston is fictionally held in its initial position indicating the cylinder is charged or after discharge in its displaced position indicating the cylinder has been discharged.

5 Claims, 2 Drawing Sheets

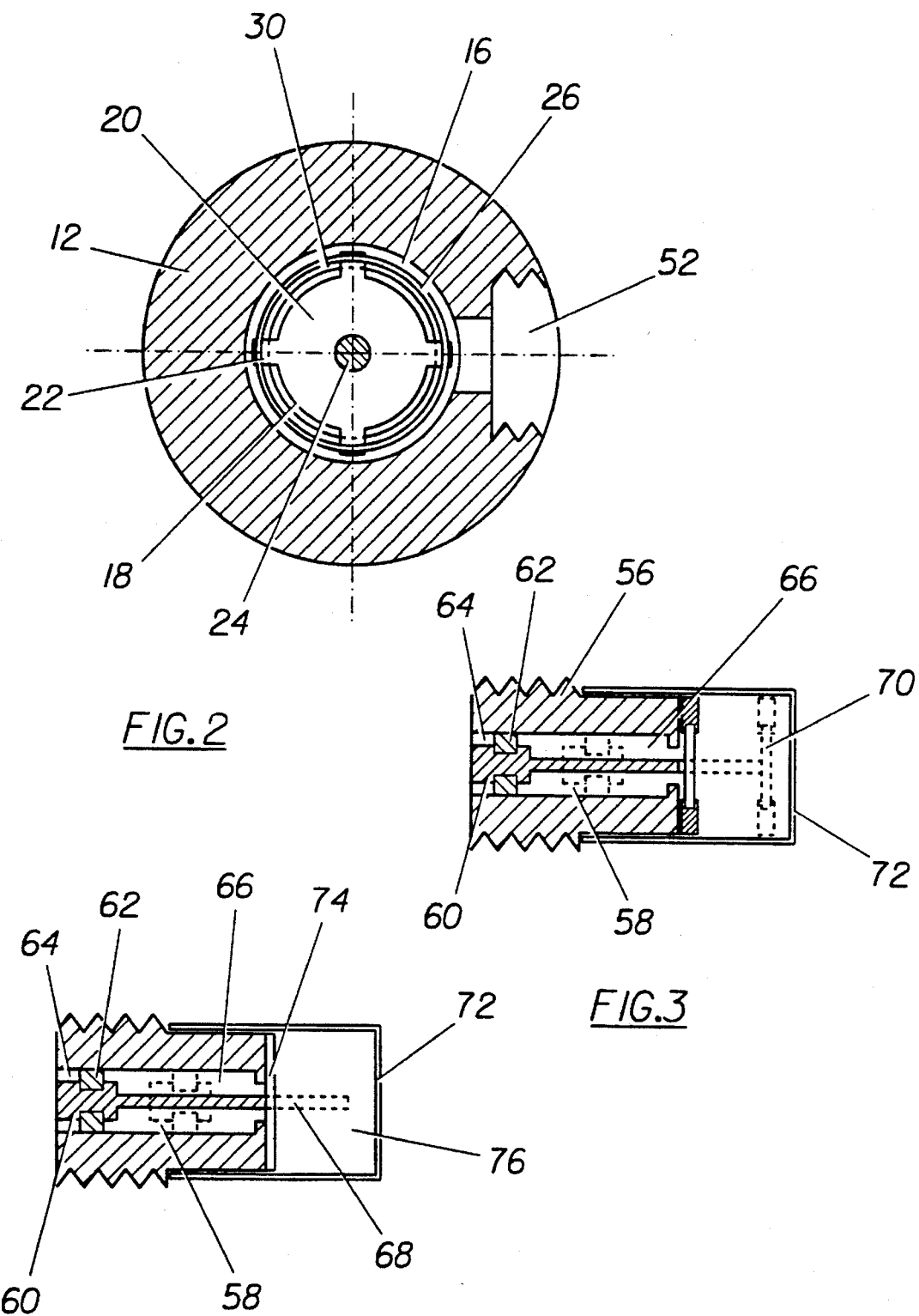

SAFETY INDICATOR FOR AN INFLATION SYSTEM

FIELD OF THE INVENTION

The present invention relates to an indicator, more particularly, the present invention relates to an indicator system for indicating that a cylinder (disposable gas cylinder) has been discharged.

BACKGROUND OF THE PRESENT INVENTION

The gas containing cylinders such as cylinders containing carbon dioxide under pressure and sealed by a puncturable disk or membrane extending across the outlet are used as a source of gas under pressure for a variety of different applications. A common use is in life saving situations wherein the gas from the cylinder is used to inflate a buoyancy device such as a life vest, either automatically or manually.

The actuating devices for penetrating the sealing membrane on a cylinder generally include a pin or the like mounted in a discharge passage and adapted on actuation to move axially in a first direction to puncture the sealing disk or membrane and then be retracted to facilitate gas flow from the cylinder, through the so formed perforation and into the discharge passage.

A number of different manufacturers produce these inflation actuating devices. U.S. Pat. Nos. 4,894,036 issued Jan. 16, 1990 to Switlik; 4,946,067 issued Aug. 7, 1990 to Kelsall; and 5,271,525 issued Dec. 21, 1993 to Petrie, illustrate several forms of piercing pin activating mechanisms for puncturing the seal on gas cylinder and directing the released gases to an inflating device or the like.

There are no safety devices associated with such gas cylinders so that one may easily determine if the cylinder has been discharged, i.e. once the gas cylinder is connected for example to the actuating mechanism for use in a life vest, it is impossible to determine whether the cylinder is still good or whether it has been discharged unless the cylinder is disassembled from the actuator. Thus, anyone relying on inflatable devices has no simple easily checked way of determining whether the gas cylinder has been discharged. Similarly, anyone inspecting these devices, for example in a routine inspection, cannot, without completely removing the cylinder, know whether or not the cylinder has been discharged.

BRIEF DESCRIPTION OF THE PRESENT INVENTION

It is an object of the present invention to provide an inexpensive, preferably disposable, indicator system for connection directly with the gas cylinder and actuated to generate a substantially permanently recognizable signal indicating the cylinder has been discharged activated when the cylinder is discharged.

Broadly, the present invention relates to a gas containing cylinder discharge indicating system comprising means for opening said gas cylinder to permit discharge of gas contained therein, a gas passage for receiving gas discharged from said cylinder, a chamber, a piston means in said chamber, said piston means dividing said chamber into a high pressure side and a low pressure side sealed from each other by sealing means on said piston means, a connecting passage, said connecting passages connecting said gas passage to said high pressure side of said chamber, said piston means including means to resist movement of said piston means in said chamber, said means to resist movement tending to hold said piston means in fixed position in said chamber under normal conditions, but insufficient to prevent movement of said piston means in said chamber from an initial position to a displaced position spaced from said initial position when subjected to gas pressure applied to said high pressure side of said chamber upon opening of said cylinder for discharge of gas therefrom, and indicator means for indicating that said piston means has been displaced into said displaced position.

Preferably, said sealing means also forms said means to resist movement and comprises an O ring extending circumferentially around said piston means between said piston means and said chamber.

Preferably, said indicator means comprising and indicator connected directly to and movably with said piston means.

Preferably, said system further comprises an indicator compartment having at least one transparent wall, said indicator means including a plug moveable in said compartment, said piston means connected with said plug to move said plug in said compartment when said piston means is displaced and said transparent wall being positioned so that the position of said plug in said compartment is visible.

Preferably, said indicator means comprises an indicator pin moveable with said piston means, a rupturable disk in the path of movement of said indicator pin when said indicator pin disk so that when said indicator pin means is moved by said piston means, said indicator pin ruptures said disk.

Preferably, said disk is contained within an indicator compartment into which said indicator pin is projected when piercing said disk on movement of said piston means to said displaced position.

BRIEF DESCRIPTION OF THE DRAWINGS

Further features, objects and advantages will be evident from the following detailed description of the preferred embodiments of the present invention taken in conjunction with the accompanying drawings in which;

FIG. 2 is a section along the line 2—2 of FIG. 1.

FIG. 3 illustrates one form of indicator or flag in a discharge indicating position.

FIG. 4 is a view similar to FIG. 2, but showing a different indicator or flag in discharge indicating portioning.

DESCRIPTION OF THE PREFERRED EMBODIMENTS

Figure 1:
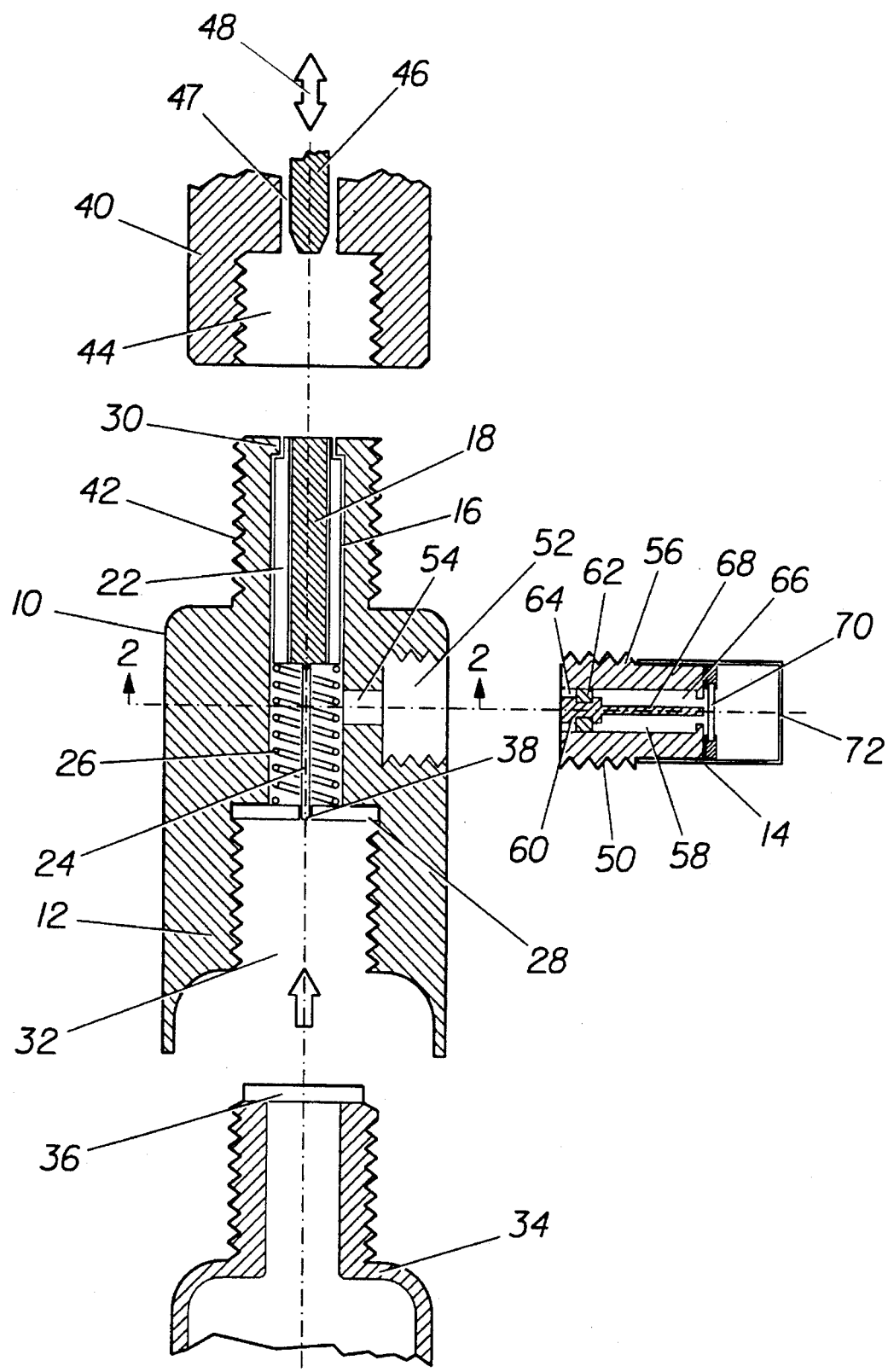
FIG. 1 is an exploded view illustrating the construction of a preferred embodiment of an indicator system of the present invention.

It is preferred that the indicating system be an inexpensive disposable signalling system that may be made a substantially permanent part of the gas cylinder and that it provide a substantially permanent signal indicating discharge of the gas cylinder after the cylinder has been discharged.

The single use discharge indicator appliance 10 is composed of two parts, namely, a body portion 12 and a signalling or indicator portion 14. The body portion 12 is provided with a central longitudinal gas passage 16 in which it is received a pin extension 18 which in the illustrated arrangement is formed by an elongated cylindrical section 20 having fins 22 projecting substantially radially outwardly therefrom. In the illustrated arrangement, there are four such fins 22 (see FIG. 2). These fins guide the extension 18 for movement axially of the passage 16 and provide space through which gas being discharged may pass along the passage 16.

A piercing pin 24 extends substantially axial from one end of the pin extension 18. The piercing pin 24 is encircled by a spring 26 which is interposed between the pin extension 18 and a retaining washer 28 adjacent a gas cylinder connecting end of the body portion 12. The spring 26 biases the pin extension 18 so that the ends of the fins 22 adjacent to the end of the extension 18 remote from the piercing pin 24 are pressed against an annular flange 30 at one end of the passage 16. Thus, the spring 26 retains the pin extension 18 and piercing pin 24 in a retracted position with the fins 22 and abutting relationship with the flange 30 (see also FIG. 2).

The retaining washer 28 is mounted in the bottom of a threaded cavity 32 which is threaded or otherwise provide with coupling means to receive a gas containing cylinder 34. The cylinder 34 in the illustrated embodiment is sealed with a conventional puncturable seal 36, i.e. the cylinder 34 may be a conventional $CO_2$ cylinder of appropriate size to carry out the required operation e.g. to inflate the object to be inflated. The appliance 10 will normally be connected to the cylinder 34 so that the seal 36 abuts preferably in sealing relationship with the washer 28 and is in a position immediately adjacent the free or piercing end 38 of the piercing pin 24 so that when the piercing pin 24 is moved axially by the pin extension 18 it will penetrate the puncturable membrane 36 and open the cylinder 34.

It is preferred to lock the cylinder 34 and appliance 10 together by using a tamper-proof arrangement preventing retraction of the cylinder 34 from the appliance 10 after the two have been assembled so there is no chance or minimal chance of unused indicator appliance being applied to a used cylinder.

A conventional triggering mechanism or unit generally indicated at 40 is connected to the end of the body member 12 remote from the cavity 32, .e.g. by the threads of the threaded extension 42 of the body 12 being threaded onto the threads within the cavity 44 of the triggering unit 40. The triggering unit 40 may be any conventional triggering unit having a piercing pin mechanism schematically represented by the pin 46 which is movable as indicated by the arrow 48 along the gas passage 47 in the conventional manner to pierce (open the gas cylinder) and then be retracted obviously. When used with the indicator appliance 10 of the present invention, the pin 46 does not directly pierce the puncturable seal 36 but as will be explained below displaces the pin extension 18 which moves the piercing pin 24 which pierces the seal 36, as will be described below.

The indicator unit 14 is attached to the body 12 of appliance 10 in the illustrated arrangement by the threads 50 on the outside of the indicator unit 14 being received within the threaded cavity 52 in the body 12. A connecting passage 54 connects the bottom of the cavity 52 with the passage 16 in the body 12 of the appliance 10.

The indicator unit 14 is formed by a cylindrical sleeve 56 having an axial chamber 58 in which it is received a piston 60 which is provided with an O ring seal received within a groove in the piston and extending circumferentially around the piston 60. The O-ring 62 and piston 60 form a seal dividing the cavity 58 and dividing it into a high pressure side communicating with the passage 54 and a low pressure side 66 opposite the high pressure side 64. The O-ring also acts as a friction member resisting movement of the piston 60 in the chamber 58.

An indicator pin 68 projects from the piston 60 through the low pressure chamber 66 which, in the arrangement illustrated in FIGS. 1 and 3, is positioned in substantially abutting relationship with a movable plug 70 contained within a transparent cap 72 which encircles and is secured to the end of the cylindrical body member 56 remote from the body 12 when the unit 10 is assembled.

When the indicator unit is assembled, the indicator 14 is connected into the cavity 52 and the high pressure side 64 of chamber 58 is in direct communication with the connecting passage 54 leading from the longitudinal passage 16. The unit 10 is fixed to the end of the cylinder 34 as above described. to form a disposable cylinder structure having an indicator to indicate whether the cylinder has been discharged.

In operation, the disposable cylinder and indicator structure is, as above described, connected to a suitable triggering mechanism 40 which when triggered forces the pin 46 to engage and axially move the extension pin 18 which axially moves the piercing pin 38 through the puncturable membrane 36. Then the trigger mechanism 40 retracts the pin 46 which permits the spring 26 to retract the pin 38 leaving a passage through the seal 36 through which compressed gasses escape from cylinder 34 and pass into the passage 16 and from there through the passage 47 of triggering the mechanism 40 to the element to be reinflated (not shown).

On opening of the cylinder 34, a relatively high pressure builds within the passage 16, i.e. the open area of the passage 16 is sufficiently small to ensure a back pressure sufficiently high to move the piston 60 in the chamber 58 is formed in the passage 16 is transmitted via the passage 54 to the high pressure side 64 of the indicator 14. This back pressure is sufficient to displace the piston 60 axially in the passage 58 from a first position to a displaced position farther to the right in FIGS. 1, 3 and 4, so that, in the embodiment shown in FIGS. 1 and 3, the plug 70 is moved together with the piston 60 to the dotted line displaced position shown thereby clearly indicating through the transparent cap 72 that the cylinder 34 has been discharged.

The friction fit between the outer periphery of the O-ring seal 62 and the inner wall of the cavity 58 is insufficient to prevent movement when subjected to the back pressure built up immediately after the cylinder 34 has been opened, but is sufficient to retain the piston and indicator plug 70 in its initial position prior to opening of the cylinder and in its displaced position after opening so that the plug or indicator indicates the condition of the cylinder 34 as either charged or discharged. In the system as described i.e. FIGS. 1 and 3, the plug 70 moves in the cap 72 from an initial position indicating the cylinder 34 is charged to a displaced position indicating the cylinder 34 has been discharged.

In the embodiment shown in FIG. 4, when the piston 60 is displaced, the pin 68 simply passes or punctures the fixed membrane 74 and moves into the cavity 76 in the transparent cap 72 to indicate that the cylinder has been discharged. In the embodiment shown in FIG. 4, a coloured gas or the like could be discharged from the low pressure side 66 into the cap 72 when the membrane 74 is punctured to provide a further indication that the cylinder has been opened.

Other means for indicating, i.e. other flagging systems for indicating that the cylinder has been discharged, i.e. an indicator moving from an "on" to an "off" position or up to a down position and remaining in the second position after discharge of the cylinder may be used as flags or indicators indicating that the cylinder has been discharged.

Having described the invention, modifications will be evident to those skilled in the art without departing from the scope of the invention as defined in the appended claims.

We claim:

1. A gas containing cylinder discharge indicating system comprising means for opening said gas cylinder to permit discharge of gas contained therein, a gas passage for receiving gas discharged from said cylinder, a chamber, a piston means in said chamber, said piston means dividing said chamber into a high pressure side and a low pressure side and including an O-ring sealing means sealing said high pressure side and said low pressure side from each other and forming a means to resist movement of said piston means, a connecting passage, said connecting passage connecting said gas passage to said high pressure side of said chamber, said means to resist movement tending to hold said piston means in fixed position in said chamber under normal conditions, but insufficient to prevent movement of said piston means in said chamber from an initial position to a displaced position spaced from said initial position when subjected to gas pressure applied to said high pressure side of said chamber upon opening of said cylinder for discharge of gas therefrom, and indicator means connected to said piston means for actuation by movement of said piston means to indicate that said piston means has been displaced into said displaced position.

2. An indicating system as defined in claim 1 wherein said indicator means comprising and indicator connected to and moveable with said piston means.

3. An indicating system as defined in claim 1 further comprising an indicator compartment having at least one transparent wall, said indicator means including a plug moveable in said compartment, said piston means connected with said plug to move said plug in said compartment when said piston means is displaced and said transparent wall being positioned so that the position of said plug in said compartment is visible.

4. An indicating system as defined in claim 1 wherein said indicator means comprises an indicator pin moveable with said piston means, a rupturable disk in the path of movement of said indicator pin when said indicator pin disk so that when said indicator pin is moved by said piston means, said indicator pin ruptures said disk.

5. An indicating system as defined in claim 4 wherein said disk is contained within an indicator compartment into which said indicator pin is projected when rupturing said disk on movement of said piston means to said displaced position.

* * * * *